Feb. 24, 1970

C. S. KNIGHT

3,496,583

CRADLE HEEL INSOLE MOLDING MACHINE

Filed Dec. 18, 1967

Inventor:
Chesterton S. Knight,
By Russell, Chittick & Pfund
Attorneys

Feb. 24, 1970

C. S. KNIGHT 3,496,583

CRADLE HEEL INSOLE MOLDING MACHINE

Filed Dec. 18, 1967

Inventor:
Chesterton S. Knight,
by Russell, Chittick & Pfund
Attorneys

Feb. 24, 1970  C. S. KNIGHT  3,496,583
CRADLE HEEL INSOLE MOLDING MACHINE
Filed Dec. 18, 1967  7 Sheets-Sheet 3

Inventor:
Chesterton S. Knight,
by Russell, Chittick & Pfund
Attorneys

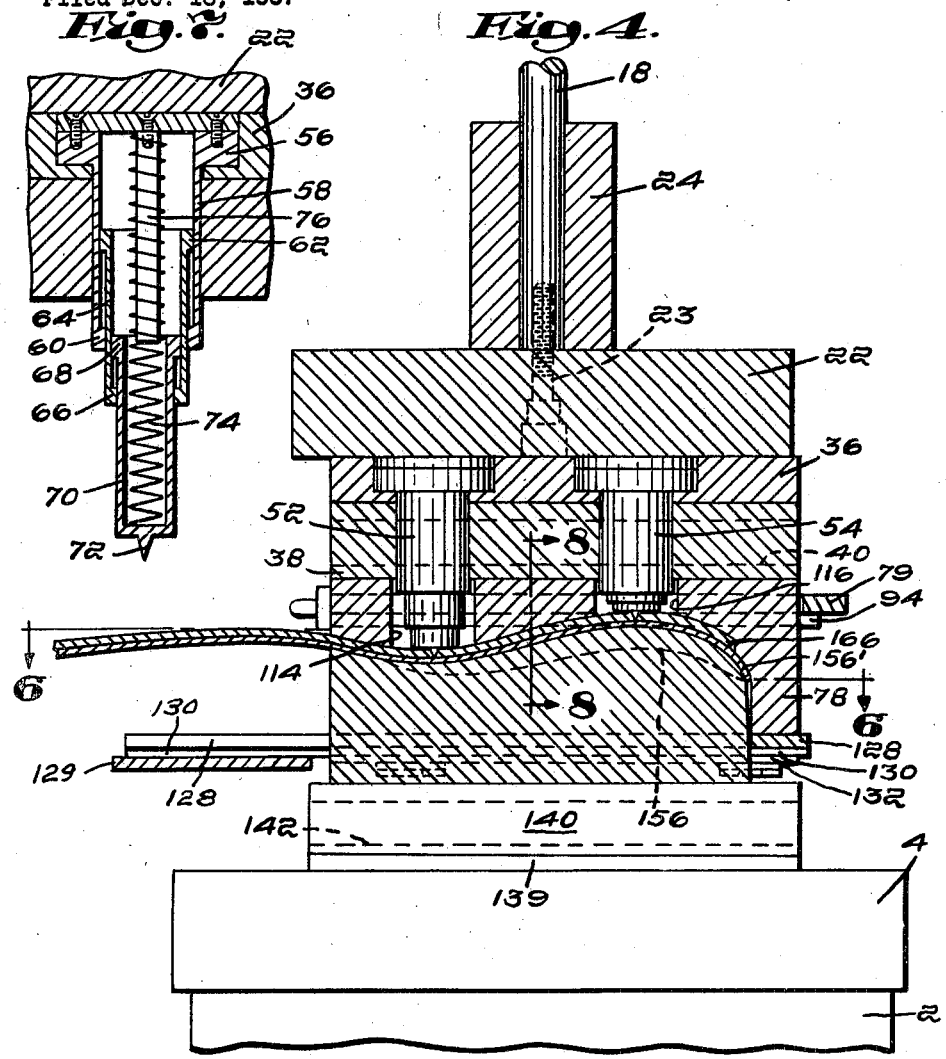
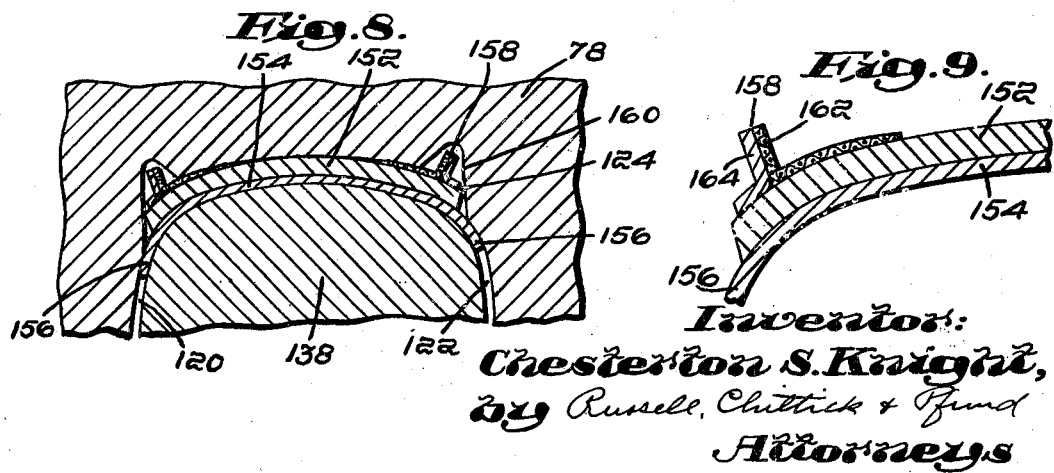

Feb. 24, 1970     C. S. KNIGHT     3,496,583
CRADLE HEEL INSOLE MOLDING MACHINE
Filed Dec. 18, 1967     7 Sheets-Sheet 5
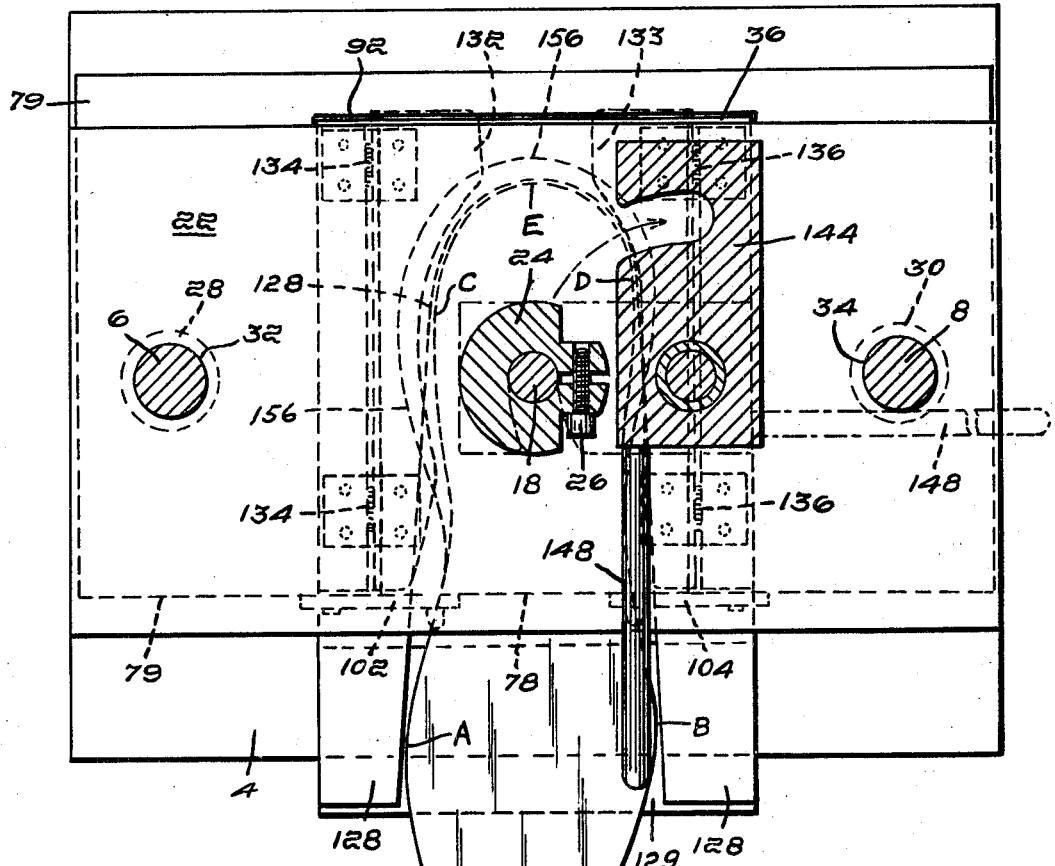
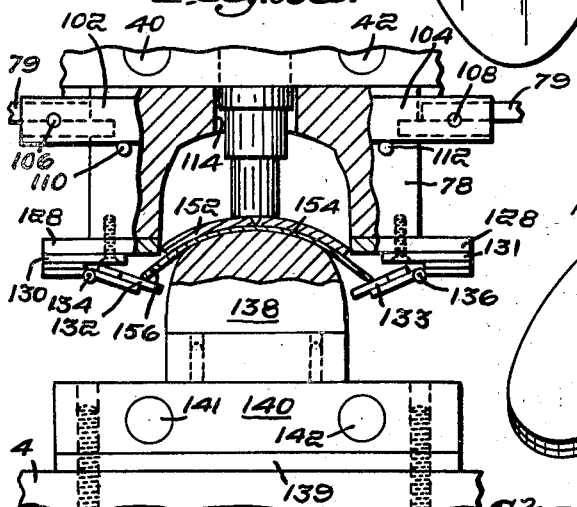
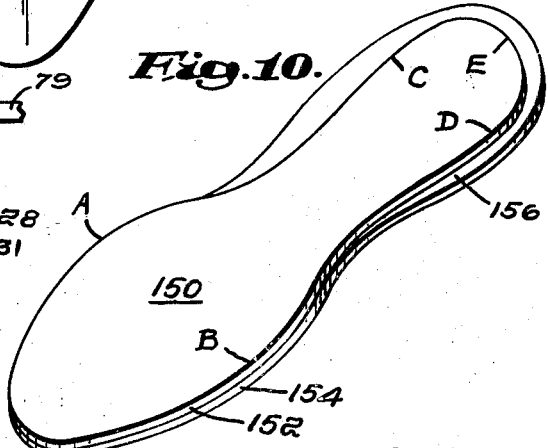
Inventor:
Chesterton S. Knight,
by Russell, Chittick & Pfund
Attorneys Feb. 24, 1970  C. S. KNIGHT  3,496,583
CRADLE HEEL INSOLE MOLDING MACHINE
Filed Dec. 18, 1967  7 Sheets-Sheet 6

Inventor:
Chesterton S. Knight,
by Russell, Chittick & Pfund
Attorneys

Feb. 24, 1970     C. S. KNIGHT     3,496,583
CRADLE HEEL INSOLE MOLDING MACHINE
Filed Dec. 18, 1967     7 Sheets-Sheet 7
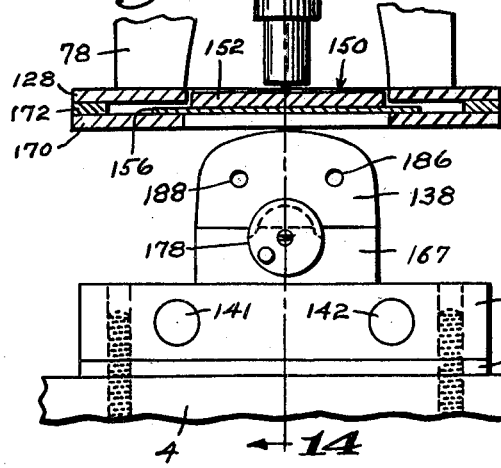
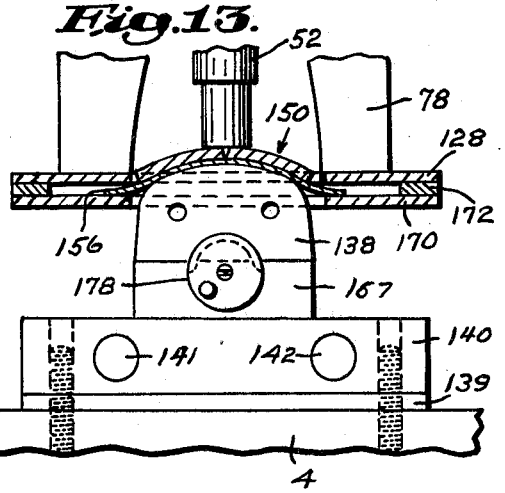
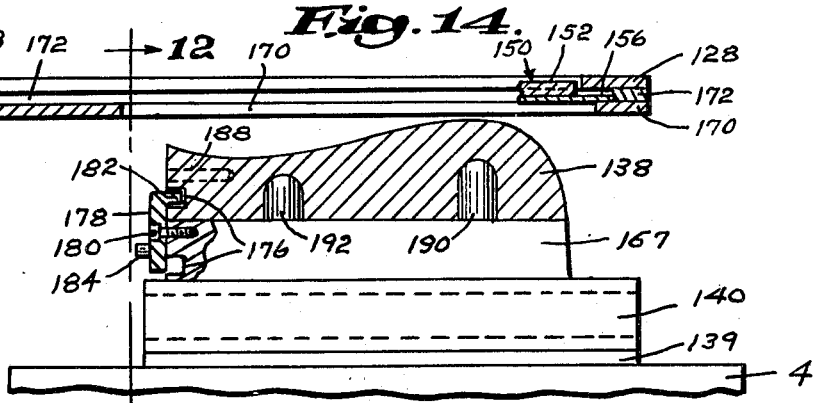
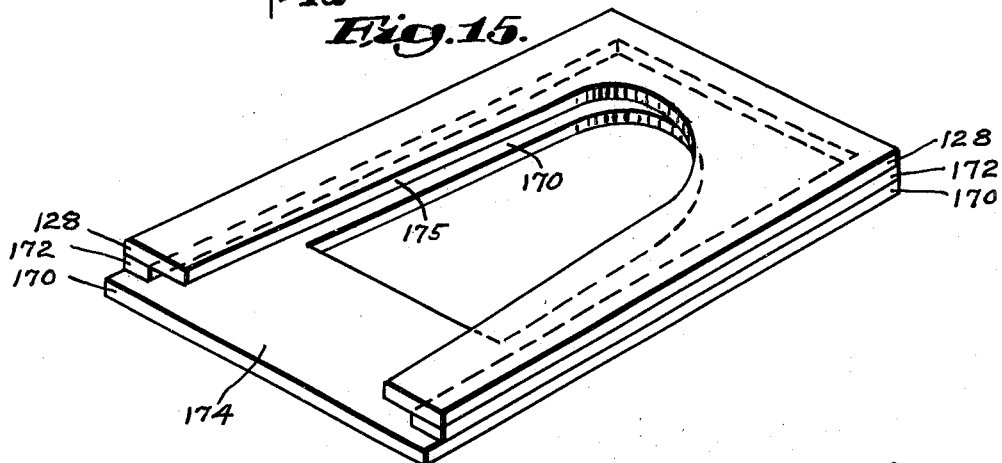
Inventor:
Chesterton S. Knight,
by Rundle, Chittick & Pfund
Attorneys 3,496,583
CRADLE HEEL INSOLE MOLDING MACHINE
Chesterton S. Knight, Brockton, Mass., assignor to Geo.
  Knight & Co., Inc., Brockton, Mass., a corporation of
  Massachusetts
Filed Dec. 18, 1967, Ser. No. 691,367
Int. Cl. A43d 65/00
U.S. Cl. 12—21                                                     13 Claims

ABSTRACT OF THE DISCLOSURE

This invention relates to the shoe manufacturing industry and is particularly concerned with a machine for molding a so-called cradle heel insole to proper configuration for immediate use thereafter in the assembly of the shoe. A cradle heel insole comprises a regular insole of conventional configuration plus a thinner upper layer which extends laterally beyond and around the heel portion of the regular insole to provide a thin peripheral flange portion. The cradle insole, when molded along with the regular insole, porduces a shallow cup-shaped formation at the heel giving improved characteristics over a conventional molded regular insole. The machine disclosed herein constituting the invention includes a novel gauging means whereby the insole may be accurately positioned with respect to the male and female molds, means for initially securing and thereafter holding the insole in the correct gauged position during the entire molding operation, and means for receiving and supporting the initially flat cradle insole flange portion thereby to hold the regular insole at the level of the gauge prior to molding. The flange supporting means operates to permit ready withdrawal of the flange as the molding operation proceeds. The invention also includes a novel configuration in the female mold whereby the mold may receive the combined thickness of regular insole plus the cradle insole over the major central area, while at the same time receiving the thinner flange portion of the cradle insole in a manner that permits the application of substantially uniform molding pressure to all parts of the insole.

BACKGROUND OF THE INVENTION

While it is old in the art to mold insoles prior to their being positioned in the shoe during the course of shoe assembly, the advent of the so-called cradle insole has presented substantial problems in the proper molding thereof if the cradle insole is to be used at once in the shoe without secondary operations of a mechanical or manual nature.

It is essential in molding an insole that the insole be exactly positioned with respect to the male and female molds so that it will assume the correct molded configuration. If the insole is initially positioned between the molds too far to the rear, or too far to one side or the other, then when molding occurs, the shape of the insole will be incorrect. Gauge mechanisms of one type or another have heretofore been used and these have served their purpose well enough so long as the insole consisted of nothing more than a regular insole. However, with the cradle insole coming into use, the previous mechanisms could not be used. The reason of this is that the cradle insole has, as previously mentioned, a laterally extending relatively thin flange around the heel which cannot be used as the gauging portion of the insole. The locating gauge in the machine must be adapted to cooperate with the regular part of the insole while at the same time means must be provided for receiving and supporting the flange of the cradle insole in its initial flat configuration with the regular insole portion located in correct position between the male and female molds before actuation. The supporting structure must include a mechanism which will permit withdrawal of the flanged portions of the cradle insole as the molds begin to close.

The problem is further complicated because insoles are customarily molded in upside down position, i.e., with the female mold on top and the male mold on the bottom. Thus, when the insole in its flat unmolded condition is initially placed between the two molds, the regular insole portion that is received within and located by the gauge plate is on top, while the laterally extending flange of the cradle insole portion is on the bottom. Therefore, when the insole is initially placed between the molds it is supported solely by the flange portion. The supporting means must be of such character that the flange on being withdrawn from the supports by actuation of the molds from its initial supporting position will not be damaged.

Accordingly, the present invention in the form of the machine hereinafter described and claimed is capable of receiving a cradle insole in its initial flat configuration, locating it accurately by means of a gauge plate adapted to engage the edges of the regular insole portion at critical points, supporting the whole insole by the laterally extending flanges of the cradle insole portion, clamping the insole in a fixed position as determined by the gauge plate on the top of the male portion of the mold and positively holding the insole in this correct position throughout the entire molding operation. The female mold has a nest or recessed area shaped to receive the regular insole plus the additional thickness of the cradle insole that overlies the regular insole. The peripheral area adjacent the nest area provides a surface against which the flange portion of the cradle insole will be pressed with substantially the same force as the main body by the male portion of the mold when the molds are in fully engaged position.

The machine is so constructed that the female mold to which the gauge plate is affixed may be readily removed and replaced by a different sized female mold having correspondingly sized gauge plate whereby other sizes of insoles may be molded. The male portion of the mold ordinarily is capable of utilization with several different sizes of female molds because of the generally constant condition of the final molded cupshape form of the cradle insole. Thus, by having for both rights and lefts as few as eight sizes of female molds and related gauge plates and two male molds, a complete range of sizes of cradle insoles can be molded. Thus it will be understood that in the following description of the invention in which reference is made to one particular female mold and one particular male mold, such molds are representative of all other molds of the same characteristics and operating in exactly the same manner, but of different sizes to meet the necessary range of sizes of inner soles required for a line of shoes.

Eight female molds are capable of covering a complete range of sizes as follows:

Mold No. 1:
    7½ and 8 _____ A and B
    6½ and 7 _____ C and D
Mold No. 2:
    8½ and 9 _____ A and B
    7½ and 8 _____ C and D
    6½ and 7 _____ E and EE
Mold No. 3:
    9½ and 10 _____ A and B
    8½ and 9 _____ C and D
    7½ and 8 _____ E and EE
Mold No. 4:
    10½ and 11 _____ A and B
    9½ and 10 _____ C and D
    8½ and 9 _____ E and EE A first male mold may be used with each of the four above listed female molds Nos. 1 to 4. Such single male mold meets the requirements of sizes 7½ to 11 A and B, 6½ to 10 C and D, and 6½ to 9 E and EE.

Mold No. 5:
  11½ and 12 _____ A and B
  10½ and 11 _____ C and D
  9½ and 10 _____ E and EE
Mold No. 6:
  12½ and 13 _____ A and B
  11½ and 12 _____ C and D
  10½ and 11 _____ E and EE
Mold No. 7:
  12½ and 13 _____ C and D
  11½ and 12 _____ E and EE
Mold No. 8:
  12½ and 13 _____ E and EE A second male mold may be used with each of the four above listed female molds Nos. 5 to 8. This second male mold meets the requirements of sizes 11½ to 13 A and B, 10½ to 13 C and D, and 9½ to 13 E and EE.

While cradle insoles are customarily made of two plies of material, one ply being the somewhat thicker regular insole and the second thinner ply affixed thereon and constituting the cradle insole portion, it is to be understood that this invention is equally capable of being utilized with a cradle insole in which the whole insole is of unitary structure. In all cases, however, the cradle insole will have a laterally extending flange thinner than the central body portion of the insole which flange extends around the heel and narrowing forwardly to the position of the instep more or less. Additionally, the invention is capable of being used with cradle insoles of the type adapted for use on all so-called welt shoes in which a rib extends about the bottom of the insole a small distance in from the edge thereof. This result is accomplished by having a corresponding groove of notch properly located in the female portion of the mold and in which the rib may be positioned during the period the cradle insole is being molded between the male and female molds.

SUMMARY

In summary, the invention comprises molding means consisting of male and female mold parts preferably utilizing a conventional air cylinder as the means for forcing the molds together and including novel gauging means for correct positioning of the cradle insole with respect to the molds, novel means for supporting the cradle insole in upside down position by releasable engagement with the cradle insole flanges, means for positively holding the insole in proper position against the male mold so that as the molds close the insole cannot shift its position whereby the exact correct molded configuration of the insole will be obtained each time the machine is operated and means whereby the molds may be easily changed to cover a complete range of sizes.

DESCRIPTION OF THE DRAWINGS

FIG. 2a shows commencement of the molding operation and the manner in which the flanges of the insole release themselves from the hinged flippers of the species shown in FIGS. 1 and 2.

FIG. 4 is a vertical section taken on the line 4—4 of FIG. 3 without however cross hatching the heater block and base plate which are conventional.

FIG. 5 is a plan view taken on the line 5—5 of FIG. 1.

FIG. 7 is a vertical sectional view of the clamping means in partially compressed condition.

FIG. 8 is a vertical section drawn to an enlarged scale and taken on the line 8—8 of FIG. 4 showing the construction of the upper mold when the insole has as a part thereof the ribs used in connection with the manufacture of welt shoes.

FIG. 9 is a still further enlargement of the cradle sole and welt rib shown in FIG. 8.

FIG. 10 shows a cradle insole in perspective in upside down position prior to the molding operation.

FIG. 12 is a fragmentary front elevation similar to FIG. 2 taken on the line 12—12 of FIG. 14 and showing another type of support for receiving the flanges of the cradle insole prior to molding as well as locking means for securing the lower mold to the base.

FIG. 13 is similar to FIG. 12 showing the manner in which the cradle insole flanges commence withdrawal from the rigid supports.

FIG. 14 is a vertical section taken on the line 14—14 of FIG. 12

FIG. 15 is a perspective view of the insole gauge and the rigid flange support spaced therebelow. This unit, also shown in various views in FIGS. 12, 13 and 14, has been detached from the bottom of the female die for clarity of illustration.

DESCRIPTION OF THE PREFERRED EMBODIMENT

Figure 1:
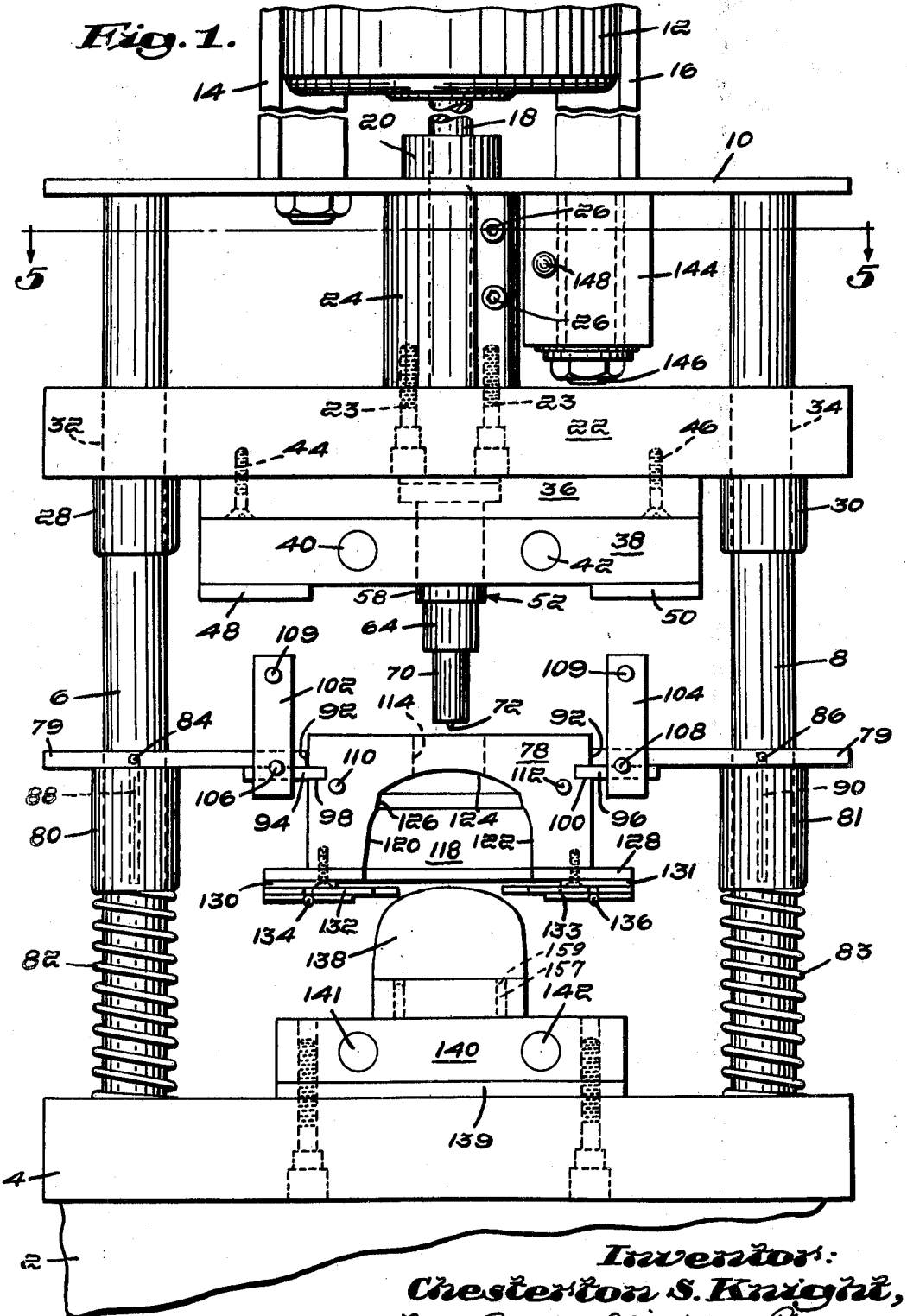
FIG. 1 shows a front elevation of the machine with the molds in separated position and the clamping means above the upper mold whereby the upper mold may be removed, and after the upper mold has been removed the lower mold may likewise be removed.
Figure 2:
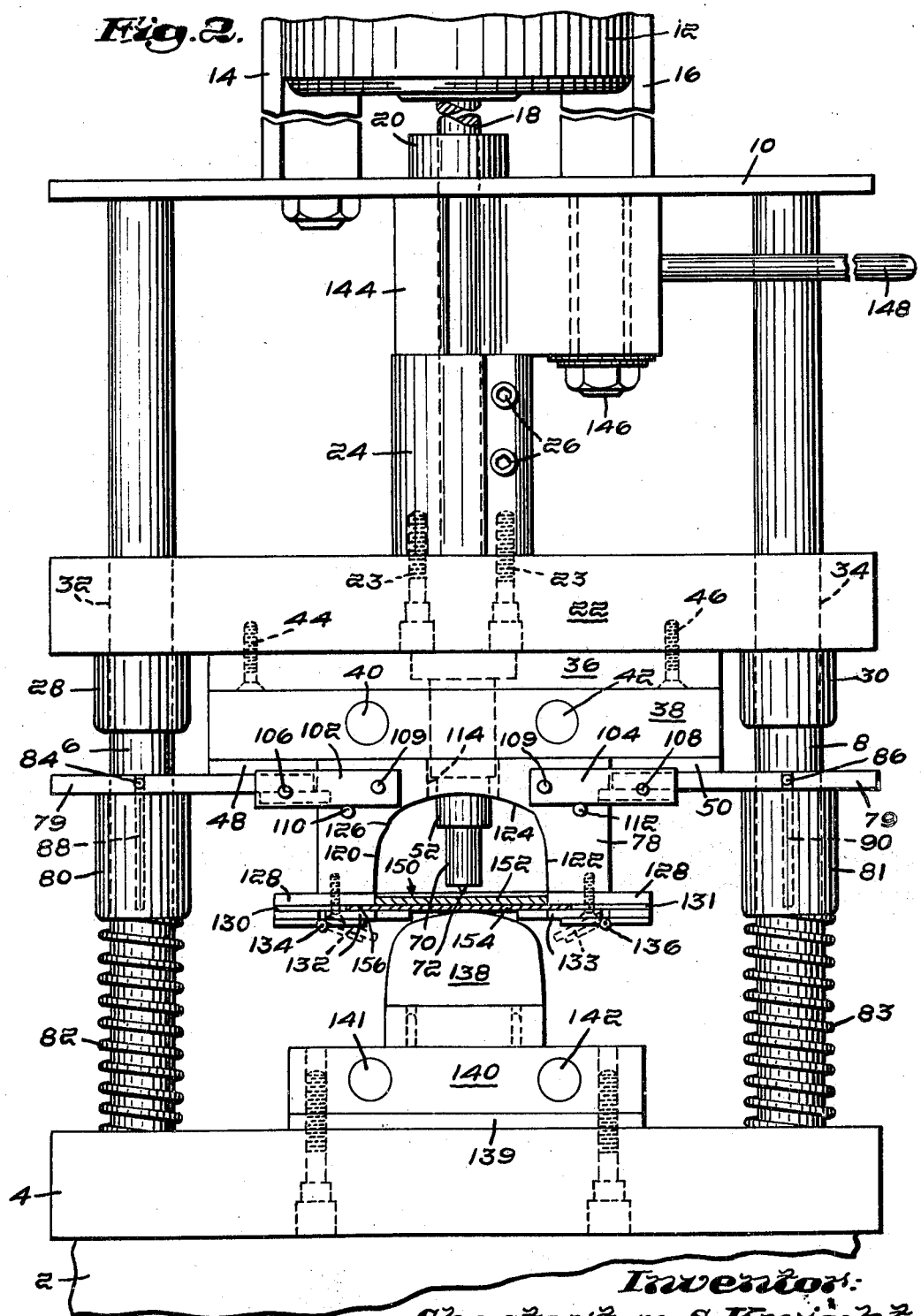
FIG. 2 is a front elevation with the molds in separated position and with the clamping means in normal position prior to actuation. A cradle insole is shown in inserted position ready for the molding operation to commence.

The machine comprises a fixed base 2 customarily mounted on the floor and of such height that the parts thereabove are readily accessible to the hands of the operator. On the base 2 is mounted a fixed base plate 4 from which upwardly extend a fixed pair of guide rods 6 and 8. On the upper ends of guide rods 6 and 8 is secured a mounting plate 10 which in turn supports an air cylinder 12 carried by any suitable supports 14 and 16. A piston 18 capable of up and down actuation by the air cylinder extends downwardly through a collar 20 and plate 10 to be secured in fixed relation at its lower end with an upper die plate 22. Surrounding the lower end of piston 18 is a collar 24 which serves the dual purpose of securing the piston to plate 22 and acting as a stop to limit upward movement of die plate 22 by engagement with the underside of mounting plate 10 as shown in FIG. 1, or with stop 144 as shown in FIG. 2. Collar 24 may be secured to plate 22 by cap screw 23 and, as best shown in FIG. 5, may be tightly clamped to piston 18 by a pair of screws 26.

Die plate 22 is guided in its up and down movement along guide rods 6 and 8 by a pair of collars 28 and 30 secured to the underside thereof. Collars 28 and 30 constitute extensions of the bores 32 and 34 through the upper die plate.

On the underside of upper die plate 22 is mounted an intermediate plate 36 to which is affixed on its underside a conventional heater block 38. The heater block carries therein conventional electrical heaters indicated by the circles 40 and 42 which serve to keep the heater block 38 at a sufficiently high temperature to transfer adequate heat to the upper female mold when in contact therewith.

The intermediate plate 36 and heater block are connected in any convenient manner to the upper die plate 22 as by screws 44 and 46. The heater block 38 has on its underside at the ends thereof insulation spacers 48 and 50 to minimize the transmission of heat to the plate therebelow that it engages during operation.

The intermediate plate 36 supports a pair of insole clamping units 52 and 54 as shown in FIG. 4. Each of these units is illustrated in detail in FIG. 7 and comprises an upper circular flange element 56 residing in a corresponding circular bore in the intermediate plate 36. From this flange 56 depends a first sleeve 58 having an inturned flange 60 at its lower end with which cooperates an outturned flange 62 on the upper end of a second sleeve 64 to limit downward movement of the second sleeve with respect to the first sleeve. Similarly, there is an inturned flange 66 at the bottom of sleeve 64 which cooperates with the outturned flange 68 on the upper end of a third sleeve 70. The bottom end of the sleeve 70 is closed and has a downwardly depending centrally located pin 72. The three sleeves 58, 64 and 70 are normally maintained at fully extended position by a compression spring 74, guided at its upper part by a depending guide rod 76. From the foregoing explanation of the clamping means, it will be obvious that when upward pressure is brought to bear on pin 72, the three sleeves are capable of telescoping one with the other to any degree required as the spring 74 is compressed.

The upper female mold 78 is supported in the following manner. A supporting plate 79 is mounted in sliding relation on guide rods 6 and 8. On the underside of plate 79 are a pair of guiding sleeves 80 and 81 which rest on compression springs 82 and 83. Upward movement of plate 79 is limited by engagement of the inner ends of pins 84 and 86 with the upper ends of the vertical keyways 88 and 90, respectively (see also FIG. 6).

Supporting plate 79 has a large rectangular notch 92 (see FIG. 5) therein of adequate size to receive the upper female mold 78. This mold is supported by a pair of longitudinally extending flanges 94 and 96 which fit into corresponding grooves 98 and 100 cut into the sides of mold 78. A pair of latch members 102 and 104 pivoted respectively at 106 and 108 act to hold the mold in place on plate 79 when they are swung downwardly to horizontal position as shown in FIG. 2. Small handles 109 facilitate actuation of the latches and stops 110 and 112 limit downward movement of the latches.

The female mold 78 has a novel configuration. First there are two aligned apertures 114 and 116 through which can extend clamping means 52 and 54. The mold 78 has an upwardly extending main cavity 118 having suitably sloping sides 120 and 122 connecting at the rear and terminating in an upper nest area 124 which is connected with the walls 120 and 122 by a narrow band 126 of different slope. This configuration makes it possible to accommodate properly the thicker major portion of the insole as well as the thinner flanges of the cradle sole portion.

Affixed to the bottom of the female mold 78 is a guage plate 128, oppositely disposed spacer plates 130 and 131, and flipper plates 132 and 133 for initially supporting the insole. The flipper plates are pivotally secured by hinges 134 and 136 which include springs of sufficient strength to hold the flipper plates in horizontal position against the weight of the insole which will be placed thereon.

A modified construction in the form of rigid supports is shown in FIGS. 12 to 15 and will be described hereinafter.

Below the female mold 78 is the male mold 138 suitably carried by the fixed base plate 4, an intermediate plate 139, and the heater block 140 with the included heaters 141 and 142.

Figure 6:
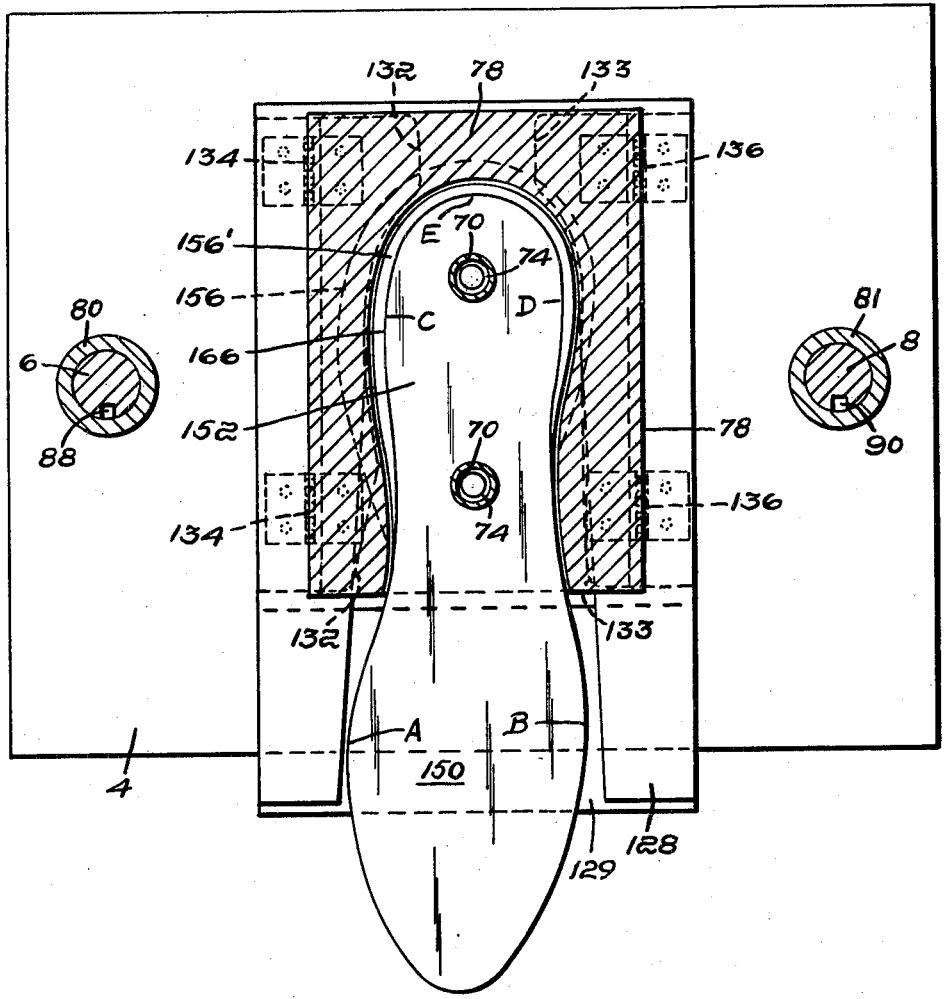
FIG. 6 is a plan view taken on the line 6—6 of FIG. 4.

In the construction shown in FIGS. 4, 5 and 6, the forwardly extending portion of the guage plate 128 may carry a crosswise extending plate over which the insole may slide as it is being inserted between the molds with flange 156 going into supported position on the flippers 132 and 133.

During normal operation of the machine, the maximum up position of upper die plate 22 will be that shown in FIG. 2. Here the upward movement of collar 24 is limited by the interposition between it and mounting plate 10 of a movable stop block 144. This stop block 144 is mounted for swinging movement on a pivot 146 by means of a handle 148. As shown in FIGS. 1, 2, 3 and 5, this stop block 144 may be swung to a position where it is clear of collar 24 in which case the upper die plate 22 and associated parts may be moved to its maximum upward position as shown in FIG. 1.

When the machine is in normal operating condition as shown in FIG. 2, the heater block 38 will be constantly in engagement with the top of female mold 78 thereby to maintain therein the required temperature for proper molding. The insulation spacers 48 and 50 minimize transmission of heat to supporting plate 79. In this position, as in FIG. 2, the clamping means 52 and 54 will be a sufficient distance above the male mold 138 to permit the insertion in upside down position of a flat unmolded cradle insole 150 as shown in FIG. 10 and illustrated in cross section in FIG. 2. The layer comprising the regular insole indicated at 152 is secured to the cradle insole layer 154. The cradle insole portion has a flange 156 also shown in FIGS. 5, 6 and 10 which extends around the heel portion of the insole. This flange portion 156 is placed in the narrow horizontal slot created by the spacer plate 130 between the underside of guage plate 128 and the top of flipper plates 132 and 133.

The guage plate 128, as seen in FIGS. 1 to 6, serves to locate the insole 150 in exact position with respect to the molds. Once in this position in which it is manually placed by the operator as in FIG. 2, the air cylinder 12 is actuated by the operator so that descent of the female mold 78 conmmences. This immediately brings the pins 72 of the clamping means 52 and 54 into piercing engagement with the upper side of insole 150 thereby to clamp the insole immovably against male mold 138. As further descent of female mold 78 continues, the clamping means telescopes upwardly as permitted by its construction (see FIG. 7), while still continuing to hold the insole in fixed relation to male mold 138. As the insole 150 commences to wrap itself about the upper curved surface of the male mold 138, the flange 156 of the cradle insole turns downwardly as illustrated in FIG. 2a, causing the flipper plates 132 and 133 to turn downwardly so that the insole may be moved upwardly along the walls 120 and 122 of the female die 78 without damage to the following flange 156.

Figure 3:
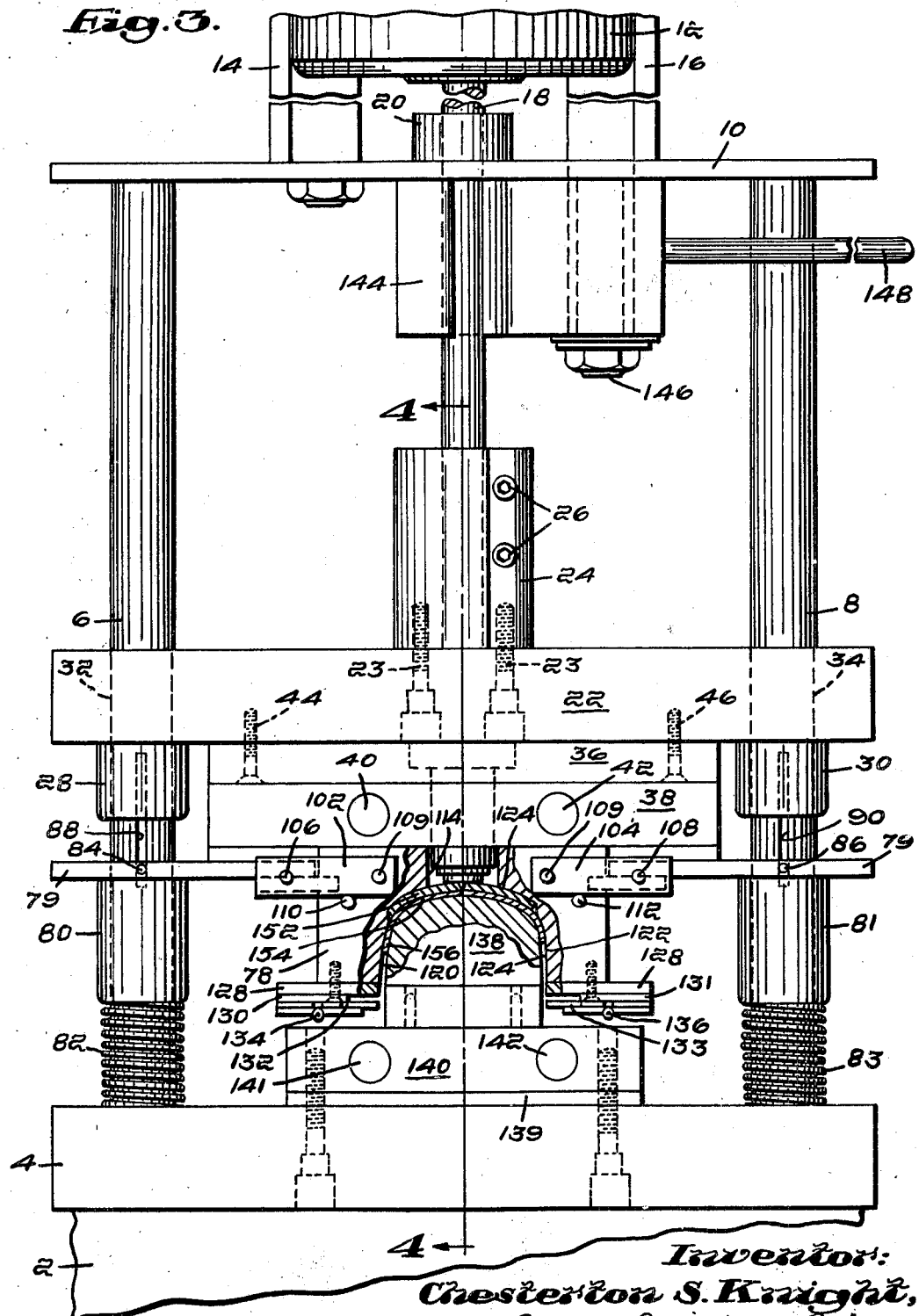
FIG. 3 shows the cradle insole in final molded position between the molds. The molds have been broken away in part showing the manner in which the upper inverted nest in the female mold receives the thick major portion of the insole, while the flange portion of the cradle insole is received in the lesser space adjacent the sides of the nest.

Downward movement of female mold 78 continues until a final position is reached, as shown in FIG. 3. Here the major portion of the insole consisting of the regular insole part 152 and the underlying part of cradle insole portion 154 completely fill the nest area 124 formed in the female mold while at the same time the flange 156 fills the lesser space below the nest between walls 120 and 124 and the male mold 138.

Figure 11:
FIG. 11 is illustrative of a molded cradle insole in rightside up position.

The male and female molds are hot enough to cause proper setting of the insole in the configuration shown in FIGS. 3, 4 and 6 after a suitable time lapse. As soon as proper setting has occurred, the female mold is withdrawn upwardly by air cylinder 12 to resume the position shown in FIG. 2, and in so moving, the clamping means will force the molded insole downwardly from its position in the nest 124 at the top of cavity 118 of the female mold so that the operator can withdraw the now molded insole from the separated molds. As soon as the molded cradle insole has been removed, another insole in flat condition, as shown in FIGS. 2 and 10, may be inserted to be molded in the manner heretofore described. FIG. 11 shows a finished molded cradle insole.

When it is necessary to change molds in order to mold a different size of insole, the stop block 144 is swung out of the way so that upper die plate 22 may move to the position shown in FIG. 1. In this position, the extreme lower ends 72 of the clamping means 52 and 54 will be above the top of female mold 78. Then, as soon as the latches 102 and 104 are swung upward to disengaged position, as shown in FIG. 1, the female mold may be drawn forwardly to slide off the supporting flanges 94 and 96 and thus be removed completely form the machine. The new size female mold adapted to cooperate with the same male mold 138 may then be put in place in the reverse manner and secured by dropping the latches 102 and 104 to horizontal position. Air cylinder 12 is then actuated enough to cause descent of the upper die plate 22 to a position slightly below that shown in FIG. 2 whereat the stop block 144 may be swung into position above collar 24. With the parts restored to the condition of FIG. 2, the new size of insole may be inserted to be accurately located within the different gauge plate 128 that is now attached to the new female mold 78. The new female mold 78 will have permanently affixed thereto not only the correct gauge plate for that mold but also suitably shaped flipper plates 132 and 133 which will act as the initial support for the flange 156 of the new sized insole 150. The molding operations may then continue as above explained until it again becomes necessary to change molds for accommodation of a different size.

As previously indicated, the male mold 138 is capable of cooperating with four consecutive sizes of female molds. When any of the next set of four female molds are used, then it becomes necessary to change male mold 138. This is done when the female mold 78 is out of the machine and the plate 22 is in the position of FIG. 1. Mold 138 is lifted vertically off the pins 157 that extend upwardly from heater block 140 into corresponding holes 159.

The molding operation heretofore described is fully as effective when molding cradle insoles which include as parts thereof the ribs that are used on welt shoes. Such arrangement is shown in detail in FIGS. 8 and 9. Here the regular insole is indicated at 152, the cradle insole at 154, and the peripherally extending ribs at 158. These ribs reside in a corresponding groove 160 formed in the upper female mold 78. The groove 160 is large enough to freely receive the ribs 158.

As shown in FIG. 9, the ribs 158 usually comprise an impregnated cloth member 162 and a moldable material portion 164. The configuration of the female mold where it engages the parts of the rib construction are adjusted to take care of any change in normal thickness.

In further explanation of the change of configuration assumed by the flange 156 of the cradle insole from its initial flat condition as in FIG. 10 to molded condition, attention is called to FIG. 6. Here the dotted line 156 shows the flange in the flat being supported by the flipper plates 132 and 133. After the molds have closed the flange 156 will have been drawn inwardly and at the same time turned downwardly as indicated at 156′. The line 166 indicates the final molded periphery of the regular insole. This corresponds with the disclosure in FIG. 4 in which the molded downturned flange portion of the cradle insole is shown at 156′ and the periphery of the molded regular insole is shown at 166. FIG. 11 illustrates the cradle insole in finished molded condition on removal from the machine and turned right side up.

Attention is now directed to FIG. 5 to indicate the manner in which gauge plate 128 functions to locate insole 150 with adequate accuracy between the molds. When so located and then held by clamping pins 52 and 54, the chance of an insole being malformed due to improper locating, as so often occurred according to prior practice, is eliminated.

There are five critical points about the insole periphery. There are indicated at A, B, C, D and E in FIGS. 5 and 6. By having the edges of the gauge taper toward the rear to be joined by the curve back edge, the insole may be pushed into position by the operator without special skill. The point E at the back edge of insole 150 engages the back of the gauge to limit axial movement. Points C and D are directed by the converging walls to place the heel portion of the insole in correct lateral position. Finally, the points A and B are directed by the gauge walls to a position in which the entire insole is now in correct alignment with the long axis of the molds.

The points A, B, C, D and E are always at the level of the walls of the gauge plate by virtue of the flange 156 being supported by the flippers 132 and 133 immediately below the rear side portions of the gauge plate and the forward part of the insole being supported by the cross plate 129.

The fit of the insole edges within and against the edge of gauge plate 128 is not tight, there being some slight clearance at the sides. This tolerance makes insertion of the insoles to proper position for molding a simple manual operation without jeopardizing the correct location between the molds.

A slightly modified structure is shown in FIGS. 12, 13, 14 and 15. The major difference relates to the means whereby the cradle insole flange 156 is supported to insure that the regular insole portion 152 of insole 150 will be maintained at the level of the gauge plate 128 so that the critical points A, B, C, D and E on the edges of the insole will engage and be located by the edge of the gauge plate thus to accurately position the insole with respect to the upper and lower molds prior to clamping the insole to the male mold.

In the previously described construction, the flange 156 of the insole rested on pivoted or flexible elements which were referred to as flippers 132 and 133. In this previously described construction, the flipper arrangement was useful where the flange 156 was of such rigidity that it could not readily be withdrawn from its supported position below the gauge plate without possible damage thereto. In many insole constructions, however, the flange portion 156 of the cradle insole part is of such flexibility that no damage will occur even though the flange support plate below the gauge plate is rigid. Thus in FIGS. 12, 13 and 14, the support plate is indicated at 170 and is spaced from the gauge plate 128 by a spacer plate 172. The support plate 170 forward of the opening through which the male mold passes extends for the full width of the gauge plate as at 174 shown in FIGS. 14 and 15.

The behavior of the flange 156 with respect to the support plate 170 as the molding operation gets under way is suggested in FIG. 13. Here the clamping pins 52 and 54 (see also FIG. 4) have descended to anchor insole 150 firmly against mold 138. Then the upper female mold 78 commences its descent which causes the insole 150 to begin to conform to the shape of male mold 138, and at the same time the flange 156 which extends around the heel (see FIG. 10) is pulled upwardly out of the recess formed between gauge plate 128 and support plate 170. As will be readily apparent from an examination of FIG. 15 (showing the gauge plate 128 as it appears removed from the bottom of the female mold 78), it is easy for the operator to insert the insole into supported position therein with the critical points of the insole A, B, C, D and E, meeting the interior edge 175 of the gauge plate to locate the insole in proper position for the subsequent molding operation.

In order to preclude any possibility of the male mold 138 sticking within the confines of the female mold after the molding operation and thereby to be lifted upwardly from its supporting base 167, a latching mechanism may be provided as shown in FIGS. 12, 13 and 14. To this end, a circular groove 176 is cut in the front face of the male mold. The upper part of this groove is in the removable portion 138 while the lower part is in the fixed support 167. A circular plate 178 is pivotally mounted on an axis 180. This plate on its inner face has a substantially semi-circular flange 182 which when rotated to be placed in that part of the groove 176 which is in the face of mold 138 will effectively lock mold 138 to base 167. When it becomes necessary to change the male mold 138, the plate 178 is rotated about 180° by use of a small handle 184 so that the flange 182 is now located in that part of circular groove 176 which is in the face of support 167. The tines of a lifting fork may then be inserted in the lifting holes 186 and 188 making it possible to lift the mold 138 (which may be quite hot at the time) vertically off the locating pins 190 and 192. Another sized mold 138 may then be substituted and when in position on suport 167, the circular plate 178 will again be rotated about 180° to place flange 182 in locking position.

It is intended to cover all changes and modifications of the examples of the invention herein chosen for purposes of the disclosure which do not constitute departures from the spirit and scope of the invention.

I claim:
1. A machine for molding cradle insoles comprising a female mold, a cooperating male mold, means for moving said molds relatively toward and away from each other in cooperating molding relation, a gauge plate fixed to and movable with said female mold whereby said insole may be accurately located with respect to said molds prior to the molding operation, means for temporarily supporting said insole in located position prior to actuation of said molds, said supporting means comprising elements connected to and immediately below said gauge plate and spaced therefrom sufficiently to receive oppositely disposed portions of the laterally extending flanges of said cradle insole, and means for positively securing said insole against said male mold in the position determined by said gauge plate prior to and throughout the molding operation.

2. The construction set forth in claim 1 in which the said means for securing the insole against the male mold extends through said female mold.

3. The construction set forth in claim 2, said securing means comprising telescoping members with spring means urging said securing means against said insole with increasing pressure as the said molds move toward each other.

4. The construction set forth in claim 1, the interior of said female mold cut away at the top to provide a nest in which the main body of said insole may be formed while the said flanges are engaged by said male and female molds in a lesser space adjacent said nest.

5. A machine for forming insoles in which the insole comprises a regular insole and a cradle insole secured thereto with flange portions of said cradle insole extending laterally beyond said regular insole; male and female molds between which said insole is pressed and molded to the required shape, said female mold having at its lower periphery an insole locating gauge plate whereby when the regular insole is positioned therewithin, said insole will be accurately located with respect to said molds prior to actuation thereof, the said gauge plate having on its underside flange supporting elements, said elements acting as means to support said laterally extending cradle insole flange portions and thereby to initially maintain said regular insole at the level of and in position within said gauge, means for positively holding said insole in its gauged position against said male mold through the molding operation, means for forcing said male and female molds toward each other with the insole therebetween, the upper interior portion of the female mold having a shallow nest shaped to receive the regular insole as it is forced thereinto by the male mold while the laterally extending flange portions of the cradle insole, having been withdrawn from said supporting elements, are pressed between said male mold and the area of the female mold adjacent said nest.

6. A machine for forming an insole in which said insole is comprised of a regular insole and a cradle insole and in which said cradle insole has flange portions that extend laterally beyond the heel part of said regular insole, said machine comprising a fixed male mold having an upper forming surface shaped to the required insole configuration, a female mold located thereabove and having a recessed upper area to provide a nest in its operative surface opposite said male mold to receive therein the regular insole, means for accurately locating said insole with respect to said molds so that when said male and female molds are forced together, said regular insole will be accurately received within said nest and the laterally flange portions of said cradle insole will be engaged on one side by said male mold and on the other side by the areas of the female mold adjacent said nest, said locating means comprising a U-shaped gauge plate affixed to the bottom of said female mold and so dimensioned that its sides will be engaged by locating positions on the edges of the regular insole when a correctly sized insole is placed within said gauge plate and means for supporting said insole in horizontal position within said gauge plate prior to actuation of the molds, said means comprising a supporting surface substantially parallel to the bottom of said gauge plate and spaced therebelow a distance sufficient to receive the laterally extending flange portions of the cradle insole, said supporting surface in relation to the edge of said gauge plate permitting ready withdrawal of said laterally extending flange portions as entry of the insole into said female mold commences on movement of said molds toward each other, and means for positively clamping said insole against said male mold while said insole is in its located position within said gauge plate and thereafter during the molding process.

7. A machine for forming an insole in which the heel part of the insole is of a substantially uniform thickness over its major area but has a laterally extending thinner flange thereabout, one face of said flange lying in the plane of one side of the insole, a pair of insole forming members comprising a male mold with said one side of the insole thereagainst and a cooperating female mold thereabove, said molds shaped to form the insole to the required configuration, the female mold being recessed to provide a nest of a depth and peripheral configuration the same as that of the periphery of the major portion of the insole when molded that defines the inner edge of said flange, a gauge plate attached to said female mold for accurately positioning said insole prior to actuation of said molds, means for holding said unmolded insole against said male mold while said insole is in located position within said gauge plate whereby upon the closing of said male and female molds the thick portion of said insole above said flange will accurately enter said nest to be formed to proper shape, and said flange will be formed to proper shape by the pressure of said male mold against the area of said female mold adjacent said nest.

8. A molding machine for molding cradle insoles comprising a fixed male mold mounted on a base and a movable famale mold mounted on a movable plate and actuated toward said male mold by a piston for forming the insole therebetween, means limiting upward movement of said female mold to a position a short distance above said male mold, said female mold having a recessed nest at its upper part to receive the thick portion of the heel part of said cradle insole, a gauge plate on the bottom of said female mold having a plurality of critical gauging points for cooperation with the sides of an insole whereby an insole may be accurately located between said molds prior to the molding operation, means connected to said female mold for supporting the flange of said cradle insole to hold said insole in gauged position within said gauge plate, and clamping means attached to said piston and extending through said female mold for positively securing said insole against said male mold throughout the molding operation.

9. The machine set forth in claim 8 in which said female mold is removably mounted on said plate to permit interchangeability of different sized molds.

10. The machine set forth in claim 8 in which there is removable stop means for limiting the upward movement of sad piston to a position at which said clamping means is sufficiently above sad male mold to permit the insertion of an insole therebetween while at the same time said clamping means extends downward through the upper part of said female mold.

11. The machine as set forth in claim 10 in which removal of said stop means will allow said piston to move upward far enough to raise said clamping means above said female mold to permit removal of said female mold.

12. The machine as set forth in claim 8 in which said male mold is comprised of a base section and an upper molding section, means holding the sections in fixed but separable relation whereby the molding section may be removed and replaced by another molding section of different dimensions.

13. In a molding machine comprising male and female molds, means for locating and securing a cradle insole in proper position between said male and female molds prior to molding said insole therebetween, said means comprising a gauge plate attached to the entrance face of said female mold, said gauge plate being open at one end and having a stop portion at the other, the opposed inner sides of said gauge plate tapering toward each other whereby an insole may be moved heelfirst longitudinally thereinto, the spacing of said sides being such that when the heel end of said insole has engaged said stop, the widest part of the heel of the insole will be located laterally by engagement with the sides of said gauge plate and the widest parts of the sole portion of said insole will be located laterally by engagement with the sides of said gauge plate nearer the said open end, means beneath said gauge plate for supporting the flange of said cradle insole to hold said insole temporarily within said gauge plate in gauged position and clamping means for securing said insole while in said gauged position and during the molding operation against said male mold, said clamping means extending through said female mold.

References Cited

UNITED STATES PATENTS 2,306,430  12/1942  Eppler _____ 12—21
3,010,127  11/1961  Howard et al. _____ 12—21

PATRICK D. LAWSON, Primary Examiner